Figure 5:
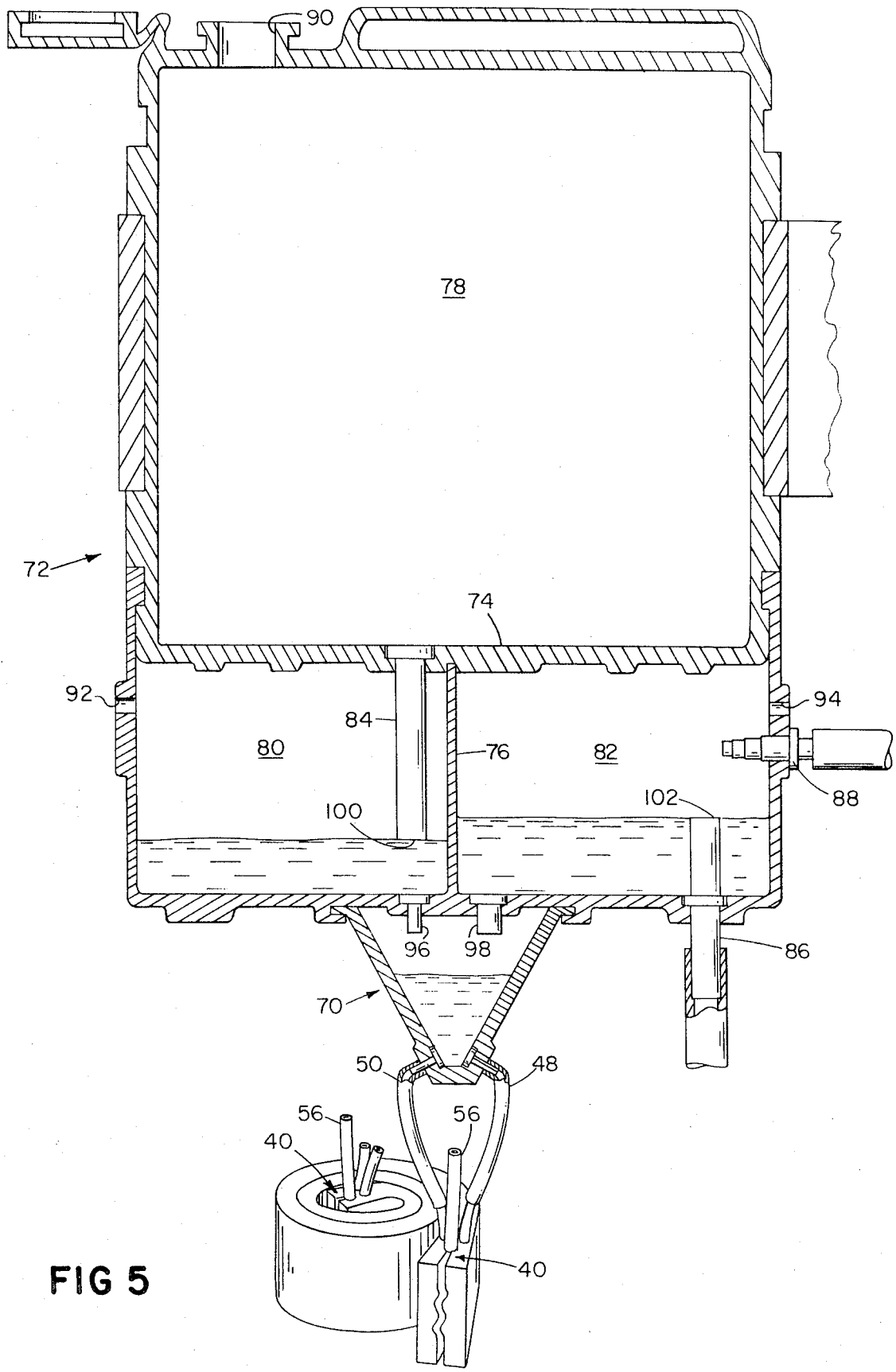

United States Patent
Serur

[11] 3,729,098
[45] Apr. 24, 1973

[54] TREATING BLOOD

[76] Inventor: Juan Ricardo Serur, 34A Harvard Ave., Brookline, Mass.

[22] Filed: Feb. 8, 1971

[21] Appl. No.: 113,568

[52] U.S. Cl. ................210/321, 23/258.5, 210/493, 210/494
[51] Int. Cl. ............................................B01d 31/00
[58] Field of Search ...................23/258.5; 210/22, 210/321, 494, 493

[56] References Cited

UNITED STATES PATENTS

| | | | |
|---|---|---|---|
| 3,547,271 | 12/1970 | Edwards | 210/321 |
| 3,352,779 | 11/1967 | Austin et al. | 210/96 X |
| 3,441,136 | 4/1969 | Serfass et al. | 210/96 X |
| 3,490,523 | 1/1970 | Esmond | 210/321 X |

Primary Examiner—Frank A. Spear, Jr.
Attorney—Gordon R. Williamson

[57] ABSTRACT

Device for treating blood comprising an elongated tubular member of semi-permeable membrane defining a blood flow path, a pair of membrane supports extending adjacent the path on opposite sides of the membrane, each support having a series of protuberances extending longitudinally of the support and spaced across the width of the support, the protuberances of one support being spaced between and overlapping the protuberances of the other support to cause the tubular member to assume a zig-zag form across its width, the supports and the tubular member defining a multiplicity of flow channels outside the tubular member and extending along the path; blood inlet and outlet members adjacent opposite ends of the tubular member and communicating exclusively with the interior thereof; and treatment fluid inlet and outlet members adjacent opposite ends of the tubular member and communicating exclusively with the exterior thereof.

7 Claims, 5 Drawing Figures

Patented April 24, 1973
3,729,098
2 Sheets-Sheet 1
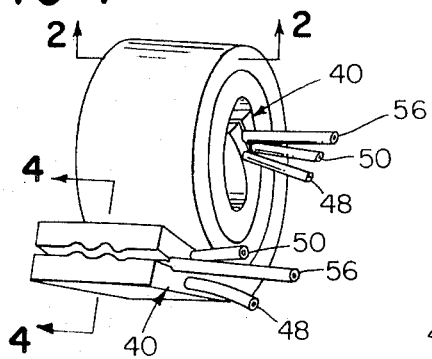
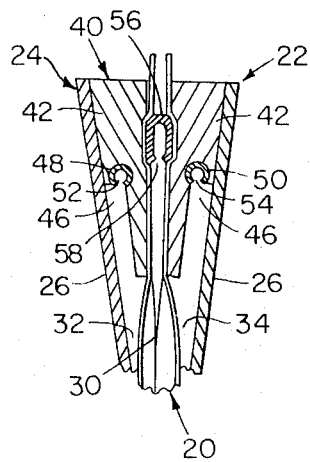
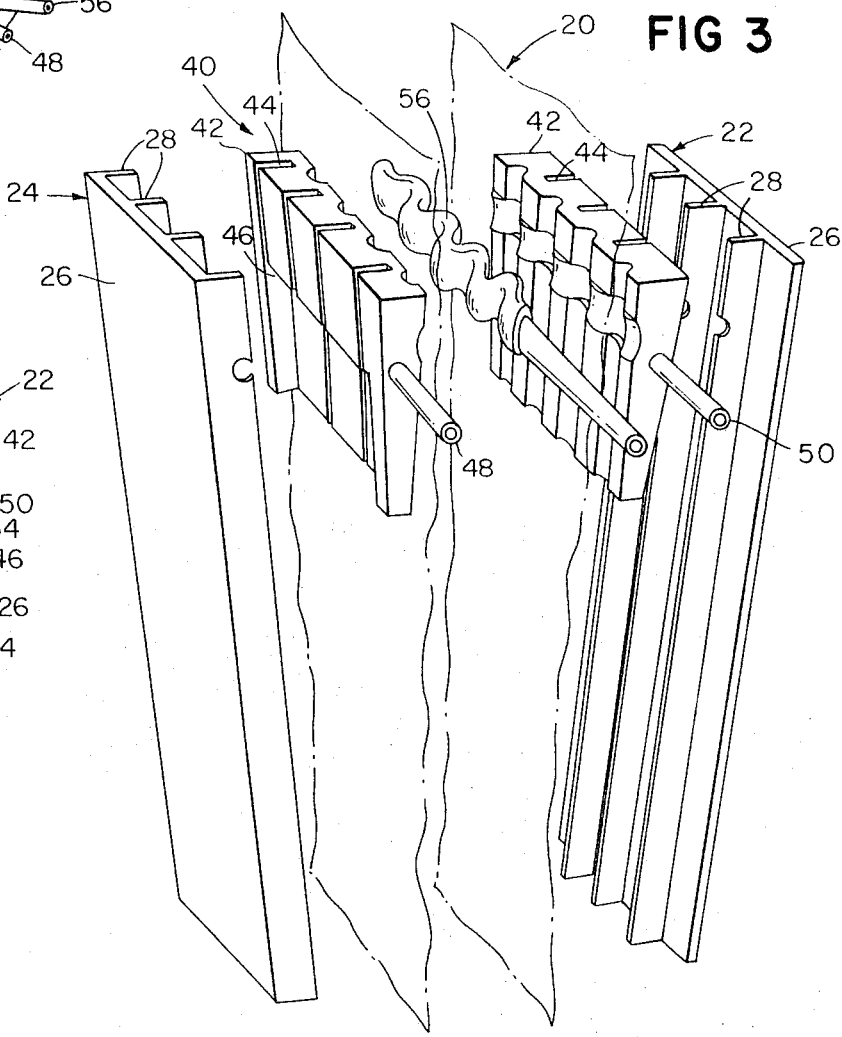
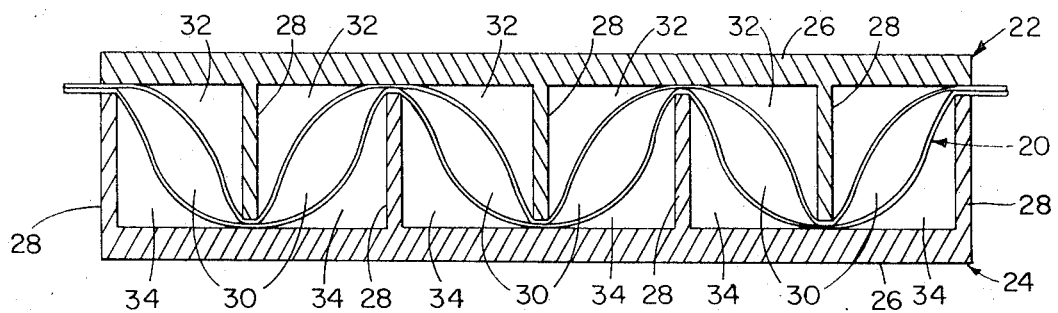

TREATING BLOOD

This invention relates to blood treatment, e.g. in artificial kidneys.

Objects of the invention are to make possible high efficiency, low cost dialysis or oxygenation of blood. In preferred embodiments an object of the inventin is to increase the efficiency of previously employed artifical kidneys in which a flat blood-carrying cellophane tube is wound spirally between a pair of corrugated supports.

In general the invention features a device for treating blood comprising an elongated tubular member of semi-permeable membrane defining a blood flow path, a pair of membrane supports extending adjacent the path on opposite sides of the membrane, each support having a series of protuberances extending longitudinally of the support and spaced across the width of the support, the protuberances of one support being spaced between and overlapping the protuberances of the other support to cause the tubular member to assume a zig-zag form across its width, the supports and the tubular member defining a multiplicity of flow channels outside the tubular member and extending along the path; blood inlet and outlet members adjacent opposite ends of the tubular member and communicating exclusively with the interior thereof; and treatment fluid inlet and outlet members adjacent opposite ends of the tubular member and communicating exclusively with the exterior thereof. In preferred embodiments the protuberances of the respective supports overlap sufficiently to pinch off the tubular member into a plurality of separate blood flow channels along the path; each support comprises a flat sheet of plastic from which protrude a series of thin ribs; the inlet and outlet members comprise tubes extending laterally of the path, the blood inlet and outlet tubes being corrugated and extending between wedge shaped members, the wedge shaped members in turn being between the supports and having grooves to receive the protuberances; the wedge shaped members having recesses adjacent the supports into which treatment fluid inlet and outlet tubes extend; and a rigid plastic mixer is provided having inlets for concentrated dialyzer fluid and water, respectively, and an outlet connected to a said treatment fluid inlet member.

Other objects, features, and advantages will appear from the following description of a preferred embodiment taken together with the attached drawings in which:

FIG. 1 is an isometric view of an artificial kidney embodying the invention;
FIG. 2 is a sectional view through 2—2 of FIG. 1;
FIG. 3 is an exploded view of an inlet member;
FIG. 4 is a sectional view through 4—4 of FIG. 1; and
FIG. 5 is an elevational view partly in section showing the artificial kidney of FIGS. 1–4 connected to a dialyzer fluid mixer.

Referring to the drawings, an elongated tube 20 of semi-permeable membrane (e.g. formed of two sheets of 30 micron thick cellophane superimposed and sealed together along their edges) is sandwiched between a pair of flexible plastic (e.g. polyvinylchloride) supports 22, 24. Each supports consists of a flat sheet 26 (1 mm thick) from which protrude a series of ribs 28 (each ½ mm wide and 5 mm high). The ribs of each support are spaced 10 mm apart, and are staggered with an overlap those of the opposite support, so that the resulting rib spacing in the sandwich is 5 mm. The ribs cause tube 20 to assume a zig-zag shape, and, by extending all the way to the wall of the opposite support, pinch tube 20 into a member of separate channels 30. Further, the outer surfaces of tube 20 define with supports 22,24, channels 32 and 34 on opposite sides of channels 30.

Input and output couplers 40 are mounted at opposite ends of the sandwich. Each coupler 40 consists of a wedge shaped piece of rubbery material 42 with grooves 44 on one side to receive ribs 28 of one support 22 or 24, and is corrugated on the other side to receive the zig-zag form of tube 20. When cemented together and to supports 22 and 24, wedges 42 seal the ends of channels 30, 32 and 34. The outer surfaces of the wedges are recessed at 46, and tubes 48, 50 respectively pass laterally through the wedges and recesses 46. Tubes 48, 50 have openings 52, 54 at recesses 46, which communicate exclusively with channels 32, 34, respectively. Similarly, corrugated tube 51 passes laterally between wedges 42 and through tube 20, and has an opening 58 that communicates exclusively with channels 30.

Preferably, the entire structure described is about 3 meters long and is arranged in spiral form (e.g. 1), with one coupler 40 at the interior of the spiral and one at the exterior.

In operation as an artifical kidney, blood is flowed into tube 56 of one coupler and dialyzer fluid into tubes 48, 50 of the other coupler. Each liquid is removed from the corresponding tube at the opposite coupler. Dialysis is highly efficient, due to the large surface area of tube 20 in its zig-zag form, the fact that all the blood flow is close to a surface of tube 20 (especially with the pinching off of tube 20 into multiple channels 30), and the countercurrent and highly turbulent flow of dialyzer fluid in the separate channels 32, 34.

Since resistance to flow is low, no blood pump is required.

FIG. 5 shows the artifical kidney of FIGS. 1–4 incorporated in a device providing for introduction of dialyzer fluid at the desired concentration. Tubes 48 and 50 extend into a rigid plastic funnel 70 integral with the bottom wall of a rigid plastic container 72 divided by internal walls 74 and 7 into upper chamber 78 and lower chambers 80 and 82. Feed tube 84 extends from chamber 78 down into chamber 80, and overflow spout 86 extends up into chamber 82. Water inlet 88 is provided in the wall of chamber 82 above spout 86, adn dialyzer fluid inlet 90 is provided at the taop of chamber 78. Vents 93 and 94 to the atmosphere are provided in the walls of chambers 80 and 82. Finally, spouts 91 and 98 extend from the bottom walls of chambers 80 and 82, respectively, into funnel 70.

In operation, chamber 78 is filled with concentrated dialyzer fluid through inlet 90, and inlet 88 is connected to a source of water. Dialyzer fluid will flow into chamber 88 until the level in that lower chamber rises to the mouth 100 of tube 84. Similarly, water will fill chamber 82 to the mouth 102 of spout 81. Dalyzer fluid and water will respectively flow into funnel 20 at rated dependent upon the diameters of spouts 91 and 98, and the levels in chambers 80 and 82 as determined by the positions of mouths 100 and 102. Highly accurate mixing of the concentrate with water is thus produced in the funnel.

Other embodiments will occur to those skilled in the art and are within the following claims.

What is claimed is:

1. A device for treating blood, comprising an elongated tubular member of semi-permeable membrane defining a blood flow path;

a pair of membrane supports extending adjacent said path on opposite sides of said membrane, each said support having a series of protuberances extending longitudinally of said support and path and spaced across the width of said support and path, said protuberances of one said support being spaced between and overlapping said protuberances of the other said support to cause said tubular member to assume a zig-zag form across its width, said supports and said tubular member defining a multiplicity of flow channels outside said tubular member and extending along said path, said protuberances of said respective supports overlapping sufficiently to pinch off said tubular member inco a plurality of separate blood flow channels along said path;

blood inlet and outlet members adjacent opposite ends of said tubular member and communicating exclusively with the interior thereof; and treatment fluid inlet and outlet members adjacent opposite ends of said tubular member and communicating exclusively with the exterior thereof.

2. The device of claim 1 wherein each said support comprises a flat sheet from which protrude a series of thin ribs.

3. The device of claim 2 wherein said supports are flexible plastic, whereby the device may assume a spiral form having a relatively long blood flow path in a dev ice of relatively small external dimensions.

4. The device of claim 1 wherein said inlet and outlet members comprise tubes extending laterally of said path.

5. The device of claim 1 further comprising a rigid gravity fed plastic mixer having inlets for concentrated dialyzer fluid and water, respectively, and an outlet connected to a said treatment fluid inlet member.

6. A device for treating blood, comprising an elongated tubular member of semi-permeable membrane defining a blood flow path;

a pair of membrane supports extending adjacent said path on opposite sides of said membrane, each said support having a series of protuberances extending longitudinally of said support and spaced across the width of said support, said protuberances of one said support being spaced between and overlapping said protuberances of the other of said support to cause said tubular member to assume a zig-zag form across its width, said supports and said tubular member defining a multiplicity of flow channels outside said tubular member and extending along said path;

blood inlet andoutlet members adjacent opposite ends of said tubular member and communicating exclusively with the interior thereof; and treatment fluid inlet and outlet members adjacent opposite ends of said tubular member and communicating exclusively with the exterior thereof;

said inlet and outlet members comprising tubes extending laterally of said path;

said blood inlet and outlet members comprising corrugated tubes.

7. The device of claim 6 wherein said corrugated tubes extend between wedge shaped members, said wedge shaped members in turn being between said supports and having grooves to receive said protuberances, said wedge shaped members having recesses adjacent said supports into which treatment fluid inlet and outlet tubes extend.

* * * * *